(12) United States Patent
Ikarashi

(10) Patent No.: US 11,934,564 B2
(45) Date of Patent: Mar. 19, 2024

(54) SECURE COMPUTATION APPARATUS, SECURE COMPUTATION METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/790,769

(22) PCT Filed: Jan. 20, 2020

(86) PCT No.: PCT/JP2020/001682
§ 371 (c)(1),
(2) Date: Jul. 5, 2022

(87) PCT Pub. No.: WO2021/149105
PCT Pub. Date: Jul. 29, 2021

(65) Prior Publication Data
US 2023/0013830 A1    Jan. 19, 2023

(51) Int. Cl.
*G06F 21/00*   (2013.01)
*G06F 7/544*   (2006.01)
*G06F 21/71*   (2013.01)

(52) U.S. Cl.
CPC .............. *G06F 21/71* (2013.01); *G06F 7/544* (2013.01)

(58) Field of Classification Search
CPC ................................ G06F 21/71; G06F 7/544
See application file for complete search history.

(56) References Cited

U.S. PATENT DOCUMENTS

2020/0153618 A1* 5/2020 Bhattacharya ........ H04L 9/0841

OTHER PUBLICATIONS

Ikarashi, "Secure Real Number Operations for Secure AI—O(|p|)-Bit Communication and O(1)-Round Right Shift Protocol-", CSS2019, 2019, 16 pages including English Translation.

(Continued)

*Primary Examiner* — Jeffrey C Pwu
*Assistant Examiner* — Thong P Truong
(74) *Attorney, Agent, or Firm* — XSENSUS LLP

(57) ABSTRACT

A secret share value [q] of a quotient q of a/p is obtained through secure computation using a secret share value [a] and a modulus p and $[a/d_0]=[(a+qp)/d_0]-[q]p/d_0, \ldots, [a/d_{n-1}]=[(a+qp)/d_{n-1}]-[q]p/d_{n-1}$ are obtained and output through secure computation using secret share values [a] and [q], divisors $d_0, \ldots, d_{n-1}$, and a modulus p. Here, [μ] is a secret share value of μ, a is a real number, n is an integer equal to or greater than 2, $d_0, \ldots, d_{n-1}$ are divisors of real numbers, p is a modulus of a positive integer, and q is a quotient of a positive integer.

11 Claims, 6 Drawing Sheets

(56) References Cited

OTHER PUBLICATIONS

Dan Bogdanov et al., "High-performance secure multi-party computation for data mining applications", International Journal of Information Security, 2012, vol. 11, Sep. 9, 2012, pp. 403-418, total 16 pages.

Ryo Kikuchi et al., "Efficient Bit-Decomposition and Modulus-Conversion Protocols with an Honest Majority", Springer, ACISP 2018, LNCS 10946, pp. 64-82, 2018, total 19 pages.

* cited by examiner

SECURE COMPUTATION APPARATUS, SECURE COMPUTATION METHOD, AND PROGRAM

CROSS-REFERENCE TO RELATED APPLICATION

The present application is based on PCT filing PCT/JP2020/001682, filed Jan. 20, 2020, the entire contents of which are incorporated herein by reference.

TECHNICAL FIELD

The present disclosure relates to a secure computation technology.

BACKGROUND ART

When various calculations are performed in secure computation, one secret share value (share) may be divided by a plurality of divisors or right-shifted with a plurality of shift amounts. NPL 1 describes a method of performing such calculations in secure computation.

CITATION LIST

Non Patent Literature

NPL 1: Dai Ikarashi, "Secure Real Number Operations for Secure AI-O(|p|)-Bit Communication and O(1)-Round Right Shift Protocol-", CSS2019, 2019.

SUMMARY OF THE INVENTION

Technical Problem

However, a method described in NPL 1 has a problem that a calculation cost is high.

The present disclosure has been made in view of these points, and an object of the present disclosure is to reduce a calculation cost in a case in which one secret share value is divided by a plurality of divisors or right-shifted with a plurality of shift amounts in secure computation.

Means for Solving the Problem

A secret share value [q] of a quotient q of a/p is obtained through secure computation using a secret share value [a] and a modulus p, and $[a/d_0]=[(a+qp)/d_0]-[q]p/d_0, \ldots, [a/d_{n-1}]=[(a+qp)/d_{n-1}]-[q]p/d_{n-1}$ are obtained and output through secure computation using the secret share value [a], the secret share value [q], divisors $d_0, \ldots, d_{n-1}$, and the modulus p. Here, [µ] is a secret share value of p, a is a real number, n is an integer equal to or greater than 2, $d_0, \ldots, d_{n-1}$ are divisors of real numbers, p is a modulus of a positive integer, and q is a quotient of a positive integer.

Effects of the Invention

In the present disclosure, because the secret share value [q] is diverted to calculations of a plurality of $[a/d_0], \ldots, [a/d_{n-1}]$, a calculation cost in a case in which one secret share value is divided by a plurality of divisors or right-shifted with a plurality of shift amounts in secure computation can be reduced.

DESCRIPTION OF EMBODIMENTS

Hereinafter, embodiments of the present disclosure will be described with reference to the drawings.

First Embodiment

In secure computation, one secret share value (share) may be divided by a plurality of divisors or may be right-shifted with a plurality of shift amounts. In the present embodiment, efficiency of such processing is improved. Typically in right shift and public divisor division, a real number a that is a calculation target is expressed as in Equation (1), and an additive secret shared value $a_i$ is used as a secret share value [a].

$$a = \sum_{0 \le i < m} a_i \bmod p \quad (1)$$

Here, $i=0, \ldots, m-1$, m is an integer equal to or greater than 1 (for example, m is an integer equal to or greater than 2), and p is a modulus of a positive integer. Further, a public decimal point position is defined for an integer on the ring so that this can be regarded as a fixed-point real number. In the embodiment, the fixed-point real number indicated on the ring in this way is simply expressed as a real number. In this case, in a case in which a quotient when the real number a is divided by the modulus p is q, the following is satisfied.

$$\sum_{0 \le i < m} a_i = qp + a \quad (2)$$

A secret share value [q] of the quotient q is used for such secure computation using the secret share value $[a]=a_i$, but the quotient q does not depend on a divisor or a shift amount. Thus, when the secret share value [q] is obtained once, the secret share value [q] can be shared for processing of obtaining a value obtained by dividing the real number a by a plurality of divisors or right-shifting the real number a with a plurality of shift amounts, through secure computation. Calculation of a quotient in secure computation includes a large amount of communication, and when the number of quotient calculations can be reduced, the efficiency of processing can be greatly improved. For example, in the processing for obtaining a value obtained by dividing the real number a by two public divisors through the secure computation, a communication amount is reduced by 30% as compared to a case in which public value division is independently performed through secure computation.

When an infinite number of public divisors is assumed, an amount of communication is reduced by 60% as compared to a case in which public value division is independently performed through secure computation. Because right shifting is equivalent to division by a power of 2, the same applies to processing for obtaining a value obtained by right-shifting the real number a with a plurality of shift amounts through secure computation. Hereinafter, a detailed description will be given.

Figure 1:
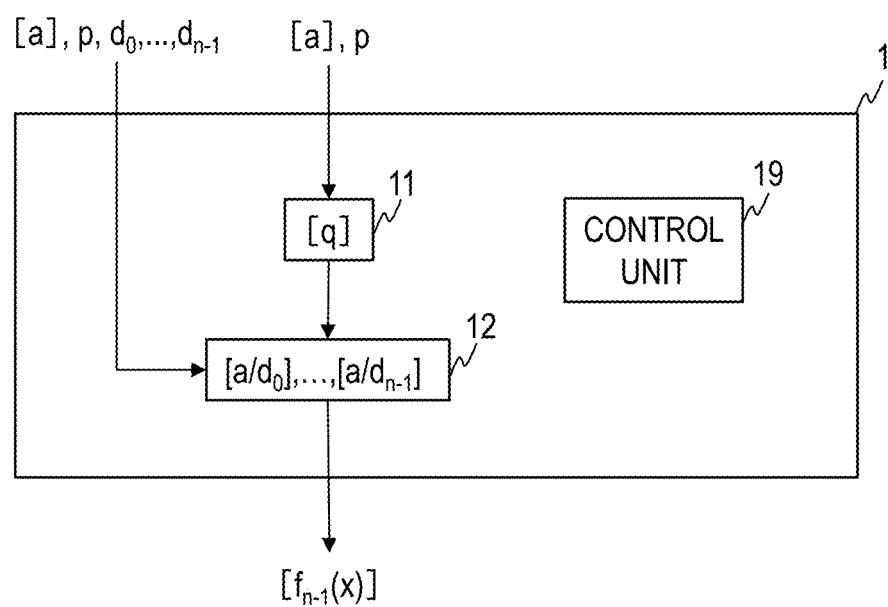
FIG. 1 is a block illustrating a functional configuration of a secure computation device of a first embodiment.

As illustrated in FIG. 1, the secure computation device 1 of the first embodiment includes secure computation units 11 and 12 and a control unit 19. The secure computation device 1 executes each processing under the control of the control unit 19. Hereinafter, [μ] is a secret share value of μ, a is a real number, n is an integer equal to or greater than 2, $d_0, \ldots, d_{n-1}$ are divisors of real numbers, p is a modulus of a positive integer, and q is a quotient of positive integer. The secret share value [μ] is a value $\mu_i$ obtained by expressing the real number p as in Equation (3) and performing additive secret sharing.

$$\mu = \sum_{0 \leq i < m} \mu_i \bmod p \qquad (3)$$

That is, [μ] is a secret share value (share) obtained by performing linear secret sharing on an element p on a quotient ring modulo p.

Figure 2:
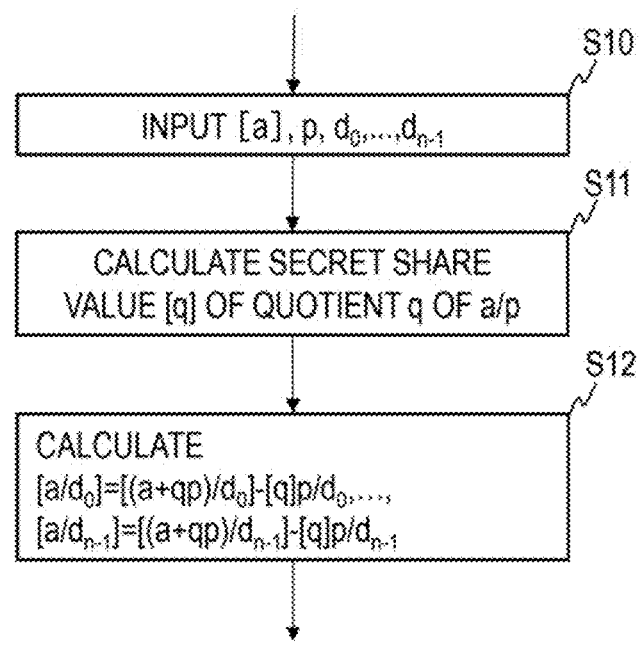
FIG. 2 is a flow diagram illustrating processing of the first embodiment.

As illustrated in FIG. 2, the secret share value [a] of the real number a, the modulus p of the positive integer, and divisors $d_0, \ldots,$ and $d_{n-1}$ are input to the secure computation device 1 (step S10).

The secret share value [a] and the modulus p are input to the secure computation unit 11. The secure computation unit 11 obtains and outputs the secret share value [q] of the quotient q of a/p through secure computation using the secret share value [a] and the modulus p (step S11).

The secret share values [a] and [q], the divisors $d_0, \ldots, d_{n-1}$, and the modulus p are input to the secure computation unit 12. The secure computation unit 12 obtains and outputs $[a/d_0]=[(a+qp)/d_0]-[q]p/d_0, \ldots, [a/d_{n-1}]=[(a+qp)/d_{n-1}]-[q]p/d_{n-1}$ through secure computation using the secret share values [a] and [q], the divisors $d_0, \ldots, d_{n-1}$, and the modulus p (step S12).

In the present embodiment, because one secret share value [q] obtained in step S11 is shared for secure computations of a plurality of $[a/d_0], \ldots, [a/d_{n-1}]$, the calculation cost can be reduced.

Second Embodiment

In the present embodiment, the secret share value [a] of the real number a is multiplied by any one of two public values $m_0$ and $m_1$ according to a condition $c \in \{0, 1\}$. When magnitude of the public values $m_0$ and $m_1$ are large, an effective number of bits of a value after multiplication (the number of bits when the number is expressed in binary) increases to a number that cannot be multiplied any more, and thus, right shifting may be performed. In the present embodiment, efficiency of such processing is improved.

Figure 3:
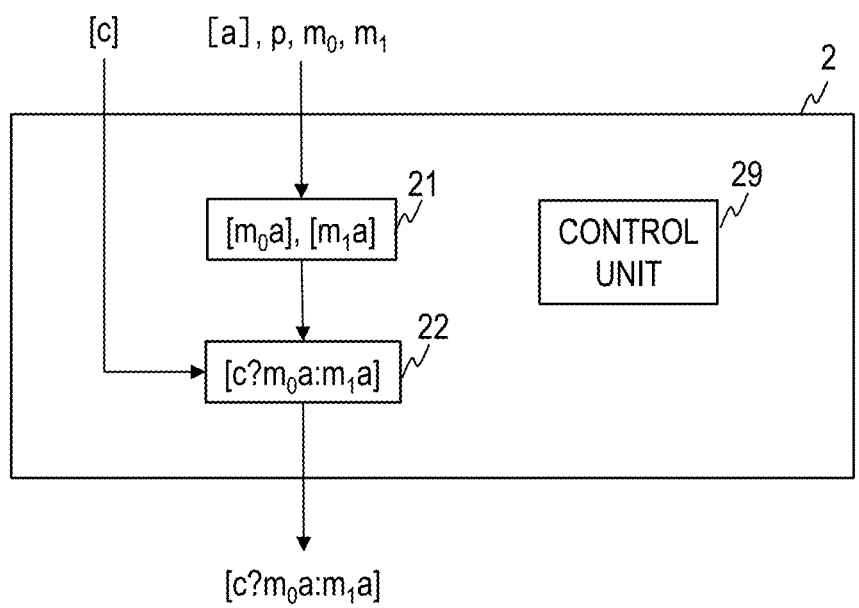
FIG. 3 is a block illustrating a functional configuration of a secure computation device of a second embodiment.
Figure 4A:
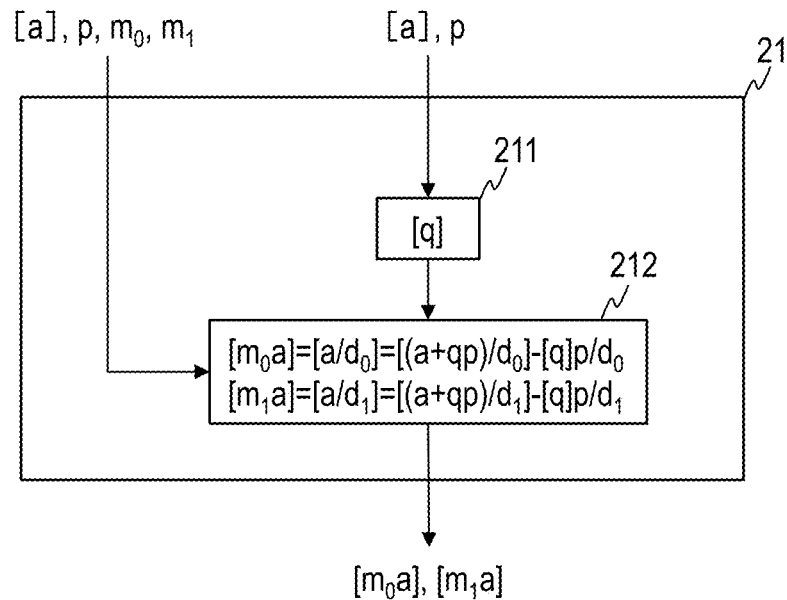
FIG. 4A is a block diagram illustrating details of a secure computation unit 21 of FIG. 3.
Figure 4B:
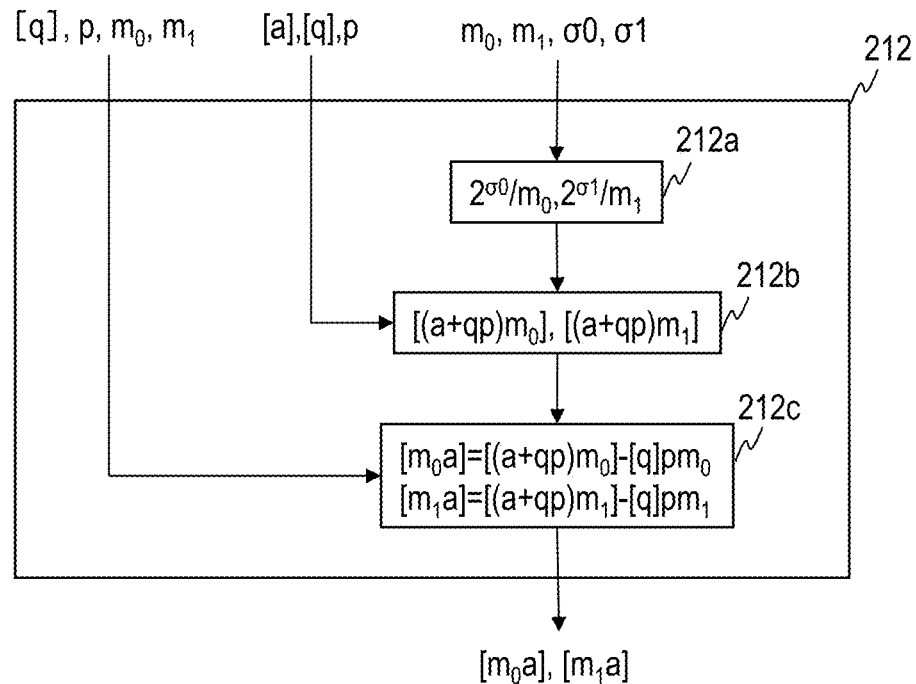
FIG. 4B is a block diagram illustrating details of a secure computation unit 212 of FIG. 4A.

As illustrated in FIG. 3, a secure computation device 2 of the present embodiment includes secure computation units 21 and 22 and a control unit 29. The secure computation device 2 executes each processing under the control of the control unit 29. As illustrated in FIG. 4A, the secure computation unit 21 of the present embodiment includes secure computation units 211 and 212. As illustrated in FIG. 4B, the secure computation unit 212 of the present embodiment includes a public value calculation unit 212a, a secure computation unit 212b, and a secure computation unit 212c.

Figure 5A:
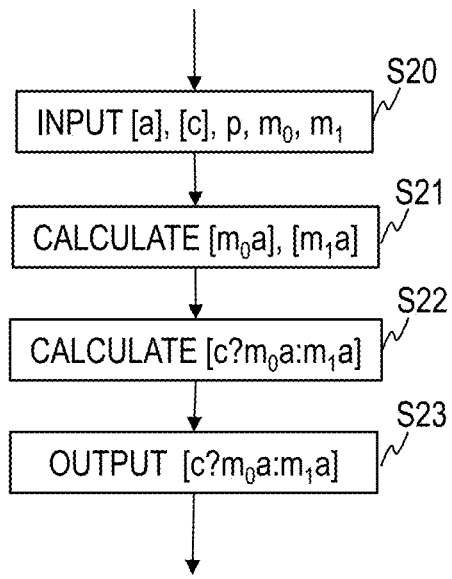
FIG. 5A is a flow diagram illustrating processing of the second embodiment.

As illustrated in FIG. 5A, a secret share value [a] of a real number a, a secret share value [c] of a value $c \in \{0, 1\}$ of 0 or 1 indicating a condition, real number multipliers $m_0$ and $m_1$ that are public values, and the modulus p are input to the secure computation device 2 (step S20).

The secret share value [a], the multipliers $m_0$ and $m_1$, and the modulus p are input to the secure computation unit 21. The secure computation unit 21 obtains and outputs secret share values $[m_0 a]$ and $[m_1 a]$ through secure computation using the secret share value [a], the multipliers $m_0$ and $m_1$, and the modulus p (step S21). A specific example of the processing of step S21 will be described below.

The secret share values $[m_0 a]$, $[m_1 a]$, and [c] are input to the secure computation unit 22. The secure computation unit 22 obtains and outputs the secret share value $[c?m_0 a:m_1 a]$ of $m_c a$ through secure computation using the secret share values [c], $[m_0 a]$, and $[m_1 a]$. That is, the secure computation unit 22 obtains and outputs $[m_0 a]$ when c=0, and obtains and outputs $[m_1 a]$ when c=1 (step S22).

Specific Example of Processing in Step S21

A specific example of processing of step S21 will be described. Here, efficiency of the processing of step S21 is improved by using the method of the second embodiment. Hereinafter, it is assumed that $d_0=1/m_0$ and $d_1=1/m_1$ are divisors, p is a modulus of a positive integer, and q is a quotient of a positive integer.

Figure 5B:
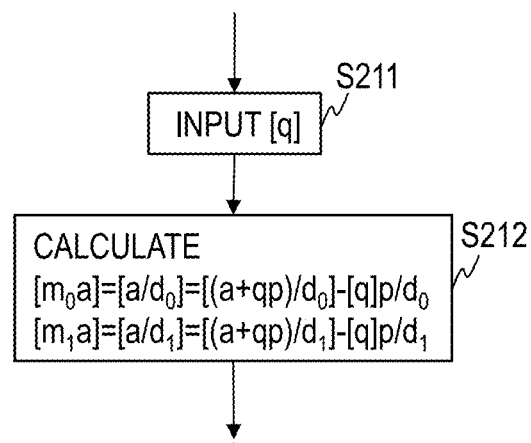
FIG. 5B is a flow diagram illustrating details of step S21 of FIG. 5A.

As illustrated in FIG. 5B, the secret share value [a] and the modulus p are input to the secure computation unit 211 of the secure computation device 21 (FIG. 4A). The secure computation unit 21 obtains and outputs the secret share value [q] of the quotient q of a/p through secure computation using the secret share value [a] and the modulus p (step S211).

The secret share values [a] and [q], divisors $d_0$ and $d_1$, and the modulus p are input to the secure computation unit 212. The secure computation unit 212 obtains and outputs $[m_0 a]=[a/d_0]=[(a+qp)/d_0]-[q]p/d_0$ and $[m_1 a]=[a/d_1]=[(a+qp)/d_1]-[q]p/d_1$ through secure computation using the secret share values [a] and [q], the divisors $d_0$ and $d_1$, and the modulus p (step S212). A specific example of the processing of step S212 will be described hereinafter.

Specific Example of Processing in Step S212

As described above, when the multipliers $m_0$ and $m_1$ are large, right shift may be performed in step S212. Hereinafter, a calculation cost is reduced by simultaneously performing right shift and multiplication by the public values $m_0$ and $m_1$. Hereinafter, positive integers, which are the number of bits indicating right shift amounts thereof, are denoted as σ0 and σ1, respectively. It may be σ0=σ1 or σ0≠σ1.

Figure 5C:
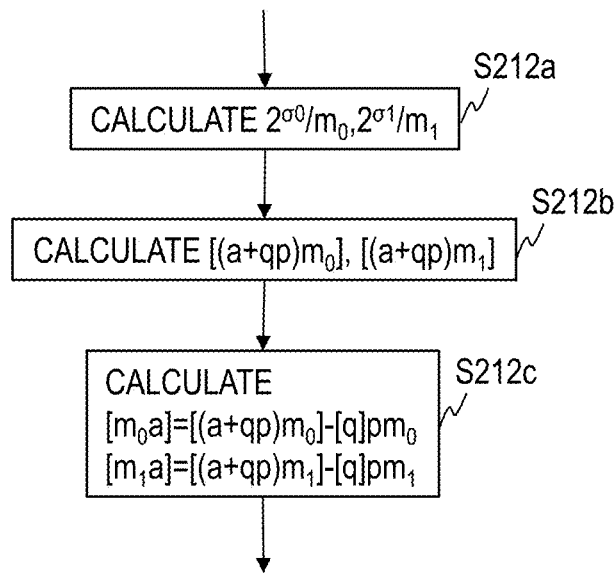
FIG. 5C is a flow diagram illustrating details of step S212 of FIG. 5B.

As illustrated in FIG. 5C, the multipliers $m_0$ and $m_1$ and the positive integers σ0 and σ1 are input to the public value calculation unit 212a of the secure computation unit 212. The public value calculation unit 212a obtains and outputs public values $2^{\sigma 0}/m_0$ and $2^{\sigma 1}/m_1$ using the multipliers $m_0$ and $m_1$ and the positive integers σ0 and σ1 (step S212a).

The secret share values [a] and [q], the modulus p, and the public values $2^{\sigma 0}/m_0$ and $2^{\sigma 1}/m_1$ are input to the secure computation unit 212b. The secure computation unit 212b performs, using the secret share values [a] and [q], the modulus p, and the public values $2^{o0}/m_0$ and $2^{o1}/m_1$ obtained by the public value calculation unit 212a, secure computation of public value division $[a+qp]/(2^{o0}/m_0)$ and secure computation of public value division $[a+qp]/(2^{o1}/m_1)$ to obtain and output a secret share value $[(a+qp)m_0]$ of a value obtained by right-shifting $(a+qp)m_0$ by o0 bits and a secret share value $[(a+qp)m_1]$ of a value obtained by right-shifting $(a+qp)m_1$ by o1 bits (step S212b).

The secret share values $[(a+qp)m_0]$, $[(a+qp)m_1]$, and $[q]$, the modulus p, and the multipliers $m_0$ and $m_1$ are input to the secure computation unit 212c. The secure computation unit 212c obtains and outputs $[m_0a]=[(a+qp)m_0]-[q]pm_0$ and $[m_1a]=[(a+qp)m_1]-[q]pm_1$ through secure computation using the secret share values $[(a+qp)m_0]$, $[(a+qp)m_1]$, and $[q]$, the modulus p, and the multipliers $m_0$ and $m_1$ (step S212c).

Normally, a secret share value [me] according to the secret share value [c], that is $[m_0]$ or $[m_1]$, is generated by an if-then-else gate, followed by multiplication $[m_ca]$ of $[m_c]$ by $[a]$. On the other hand, in the present embodiment, the secret share values $[m_0a]$ and $[m_1a]$ are obtained (step S21), and then a secret share value $[c?m_0a:m_1a]$ of $m_ca$ is obtained through secure computation using the secret share values [c], $[m_0a]$, and $[m_1a]$ (step S22). Step S21 is executed before step S22 so that the secret share value $[m_ca]$ can be achieved through public value multiplication, which have a low calculation cost, of the multipliers $m_0$ and $m_1$ that are public values and the secret share value [a]. Thus, in the present embodiment, the calculation cost can be reduced. In particular, even when the right shifting is performed in step S212 in a case in which the multipliers $m_0$ and $m_1$ are large as in the specific example of the processing of step S212, the calculation cost can be reduced by performing processing of right shifting and the multiplication by the public values $m_0$ and $m_1$ at the same time. This processing can be applied because the multipliers $m_0$ and $m_1$ are public values, which can be achieved by executing step S22 after step S21. Further, efficiency of the processing of step S21 is improved using the method of the second embodiment as in the specific example of the processing of step S21, so that the calculation cost can be further reduced.

Hardware Configuration

The secure computation devices 1 and 2 in the embodiments are, for example, devices configured by a general-purpose or dedicated computer including a processor (hardware processor) such as a central processing unit (CPU), a memory such as a random-access memory (RAM) or a read-only memory (ROM), and the like executing a predetermined program. This computer may include one processor and memory or may include a plurality of processors and memories. This program may be installed in a computer or may be recorded in a ROM or the like in advance. Further, a part or all of processing units may be configured by using an electronic circuit that implements a processing function alone, instead of an electronic circuit (circuitry) that implements a functional configuration by a program being read, like a CPU. Further, an electronic circuit constituting one device may include a plurality of CPUs.

Figure 6:
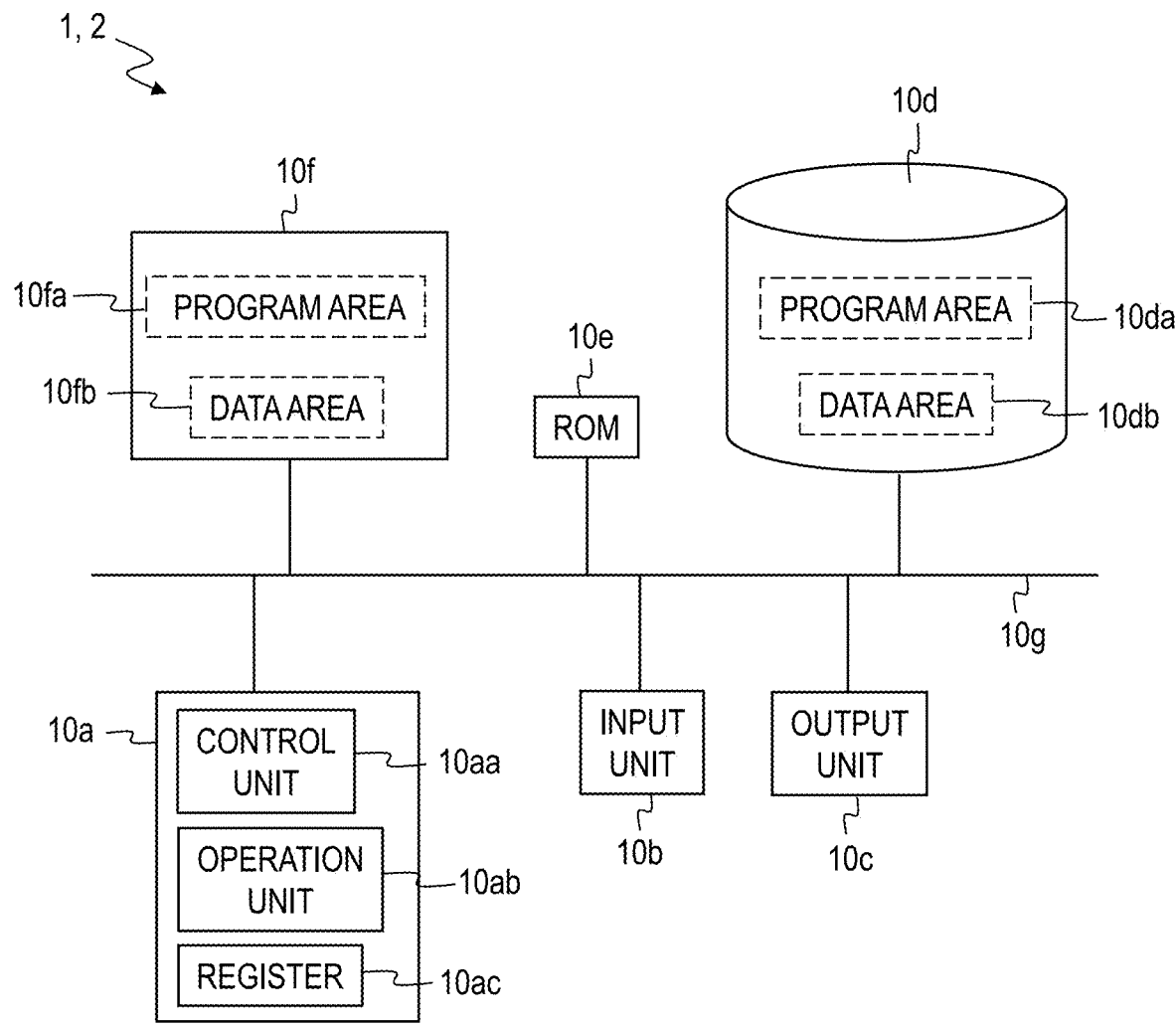
FIG. 6 is a block diagram illustrating a hardware configuration.

FIG. 6 is a block diagram illustrating hardware configurations of the secure computation devices 1 and 2 in the embodiments. As illustrated in FIG. 6, the secure computation device 1 of this example includes a central processing unit (CPU) 10a, an input unit 10b, an output unit 10c, a random access memory (RAM) 10d, a read only memory (ROM) 10e, an auxiliary storage device 10f, and a bus 10g. The CPU 10a of this example includes a control unit 10aa, an operation unit 10ab, and a register 10ac, and executes various pieces of operation processing according to various programs read into the register 10ac. Further, the output unit 10c is an output terminal, a display, or the like on which data is output. Further, the output unit 10c is a LAN card or the like controlled by the CPU 10a that has read a predetermined program. Further, the RAM 10d is a static random access memory (SRAM), a dynamic random access memory (DRAM), or the like, and has a program area 10da in which a predetermined program is stored and a data area 10db in which various types of data is stored. Further, the auxiliary storage device 10f is, for example, a hard disk, a magneto-optical disc (MO), a semiconductor memory, or the like, and has a program area 10fa in which a predetermined program is stored and a data area 10fb in which various types of data is stored. Further, the bus 10g connects the CPU 10a, the input unit 10b, the output unit 10c, the RAM 10d, the ROM 10e, and the auxiliary storage device 10f so that information can be exchanged. The CPU 10a writes the program stored in the program area 10fa of the auxiliary storage device 10f to the program area 10da of the RAM 10d according to a read operating system (OS) program. Similarly, the CPU 10a writes various types of data stored in the data area 10fb of the auxiliary storage device 10f to the data area 10db of the RAM 10d. An address on the RAM 10d in which this program or data is written is stored in the register 10ac of the CPU 10a. The control unit 10ab of the CPU 10a sequentially reads out these addresses stored in the register 10ac, reads a program or data from the area on the RAM 10d indicated by the read address, causes the operation unit 10ab to sequentially execute operations indicated by the program, and stores operation results in the register 10ac. With such a configuration, functional configurations of the secure computation devices 1 and 2 is implemented.

The above-described program can be recorded on a computer-readable recording medium. An example of the computer-readable recording medium is a non-transitory recording medium. Examples of such a recording medium are a magnetic recording device, an optical disc, a photomagnetic recording medium, and a semiconductor memory.

Distribution of this program is performed, for example, by selling, transferring, or renting a portable recording medium such as a DVD or CD-ROM on which the program has been recorded. Further, this program may be distributed by being stored in a storage device of a server computer and transferred from the server computer to another computer via a network. As described above, the computer that executes such a program first temporarily stores, for example, the program recorded on the portable recording medium or the program transferred from the server computer in a storage device of the computer. When the computer executes the processing, the computer reads the program stored in the storage device of the computer and executes processing according to the read program. Further, as another form of execution of the program, the computer may directly read the program from the portable recording medium and execute the processing according to the program, and further, the processing according to the received program may be sequentially executed each time the program is transferred from the server computer to the computer. Further, a configuration in which the above-described processing may be executed by a so-called application service provider (ASP) type service that implements a processing function only by an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

In each embodiment, although the present device is configured by a predetermined program being executed on the computer, at least a part of processing content of thereof may be implemented by hardware.

The present disclosure is not limited to the above-described embodiments. For example, in the above-described embodiment, $[a/d_0], \ldots, [a/d_{n-1}]$ are obtained, but the present disclosure is not limited thereto, and a secure computation value $f([a], [q], d_\theta)$ of a value obtained by operations including right-shifting and division by the public value $d_\theta$ for $\theta=0, \ldots, n-1$ may be obtained through secure computation using the secret share values [a] and [q], the divisors $d_0, \ldots, d_{n-1}$, and the modulus p. In addition, the various processing described above may not only be executed in chronological order according to the description but may also be executed in parallel or individually according to processing capacity of a device that executes the processing or as necessary. In addition, it is obvious that change can be made appropriately without departing from the spirit of the present disclosure.

INDUSTRIAL APPLICABILITY

The present disclosure can be used, for example, for calculation of an elementary function such as a reciprocal function, a square root function, an exponential function, and a logarithmic function in machine learning and data mining performed in secure computation while concealing data.

REFERENCE SIGNS LIST 1, 2: Secure computation device

The invention claimed is:

1. A secure computation device,
wherein $[\mu]$ is a secret share value of $\mu$, a is a real number, n is an integer equal to or greater than 2, $d_0, \ldots, d_{n-1}$ are divisors of real numbers, p is a modulus of a positive integer, and q is a quotient of a positive integer, the secure computation device comprising processing circuitry configured to:
obtain a secret share value [q] of a quotient q of a/p through secure computation using a secret share value [a] and a modulus p; and
obtain and output $[a/d_0]=[(a+qp)/d_0]-[q]p/d_0, \ldots, [a/d_{n-1}]=[(a+qp)/d_{n-1}]-[q]p/d_{n-1}$ through secure computation using the secret share value [a], the secret share value [q], the divisors $d_0, \ldots, d_{n-1}$, and the modulus p, wherein the output $[a/d_0]=[(a+qp)/d_0]-[q]p/d_0, \ldots, [a/d_{n-1}]=[(a+qp)/d_{n-1}]-[q]p/d_{n-1}$ is stored in a register of the processing circuitry and the secure computation is used in machine learning or data mining.

2. A secure computation device,
wherein $[\mu]$ is a secret share value of $\mu$, a is a real number, $m_0$ and $m_1$ are multipliers of real numbers, and c is a value of 0 or 1 indicating a condition, the secure computation device comprising:
first secure computation circuitry configured to obtain $[m_0a]$ and $[m_1a]$ through secure computation using a secret share value [a] and the multipliers $m_0$ and $m_1$; and
second secure computation circuitry configured to obtain and output a secret share value $[c?m_0a:m_1a]$ of $m_0a$ through secure computation using secret share values [c], $[m_0a]$, and $[m_1a]$, wherein the secret share value $[c?m_0a:m_1a]$ is stored in a register of the processing circuitry and the secure computation is used in machine learning or data mining.

3. The secure computation device according to claim 2,
wherein $d_0=1/m_0$ and $d_1=1/m_1$ are divisors, p is a modulus of a positive integer, and q is a quotient of a positive integer, and
the first secure computation circuitry includes
third secure computation circuitry configured to obtain a secret share value [q] of a quotient q of a/p through secure computation using the secret share value [a] and a modulus p; and
fourth secure computation circuitry configured to obtain and output $[m_0a]=[a/d_0]=[(a+qp)/d_0]-[q]p/d_0$ and $[m_1a]=[a/d_1]=[(a+qp)/d_1]-[q]p/d_1$ through secure computation using the secret share value [a], the secret share value [q], the divisors $d_0$ and $d_1$, and the modulus p.

4. The secure computation device according to claim 3,
wherein $\sigma 0$ is positive integer that is the number of bits indicating a right shift amount and $\sigma 1$ is positive integer that is the number of bits indicating a right shift amount, and
the fourth secure computation circuitry includes
public value calculation circuitry configured to obtain public values $2^{\sigma 0}/m_0$ and $2^{\sigma 1}/m_1$ using the multipliers $m_0$ and $m_1$ and the positive integer $\sigma 0$ and the positive integer $\sigma 1$;
fifth secure computation circuitry configured to perform, using the secret share value [a], the secret share value [q], the modulus p, and the public values $2^{\sigma 0}/m_0$ and $2^{\sigma 1}/m_1$ obtained by the public value calculation circuitry, secure computation of public value division $[a+qp]/(2^{\sigma 0}/m_0)$ and secure computation of public value division $[a+qp]/(2^{\sigma 1}/m_1)$ to obtain a secret share value $[(a+qp)m_0]$ of a value obtained by right-shifting $(a+qp)m_0$ by $\sigma 0$ bits and a secret share value $[(a+qp)m_1]$ of a value obtained by right-shifting $(a+qp)m_1$ by $\sigma 1$ bits; and
sixth secure computation circuitry configured to obtain and output $[m_0a]=[(a+qp)m_0]-[q]pm_0$ and $[m_1a]=[(a+qp)m_1]-[q]pm_1$ through secure computation using the secret share value $[(a+qp)m_0]$, the secret share value $[(a+qp)m_1]$, the secret share value [q], the modulus p, and the multipliers $m_0$ and $m_1$.

5. A secure computation device,
wherein $[\mu]$ is a secret share value of $\mu$, a is a real number, n is an integer equal to or greater than 2, $d_0, \ldots, d_{n-1}$ are divisors of real numbers, p is a modulus of a positive integer, and q is a quotient of a positive integer, the secure computation device comprising processing circuitry configured to:
obtain a secret share value [q] of a quotient q of a/p through secure computation using a secret share value [a] and a modulus p; and
obtain and output a secure computation value $f([a], [q], d_\theta)$ of a value obtained by operations including right-shifting and division by a public value $d_\theta$ for $\theta=0, \ldots, n-1$ through secure computation using the secret share value [a], the secret share value [q], the divisors $d_0, \ldots, d_{n-1}$, and the modulus p, wherein the secure computation value $f([a], [q], d_\theta)$ is stored in a register of the processing circuitry and the secure computation is used in machine learning or data mining.

6. A secure computation method,
wherein $[\mu]$ is a secret share value of $\mu$, a is a real number, n is an integer equal to or greater than 2, $d_0, \ldots, d_{n-1}$ are divisors of real numbers, p is a modulus of a positive integer, and q is a quotient of a positive integer, the secure computation method, performed by processing circuitry, comprising:

obtaining a secret share value [q] of a quotient q of a/p through secure computation using a secret share value [a] and a modulus p; and obtaining and outputting $[a/d_0]=[(a+qp)/d_0]-[q]p/d_0, \ldots, [a/d_{n-1}]=[(a+qp)/d_{n-1}]-[q]p/d_{n-1}$ through secure computation using the secret share value [a], the secret share value [q], the divisors $d_0, \ldots, d_{n-1}$, and the modulus p, wherein the output $[a/d_0]=[(a+qp/d_0]-[q]p/d_0, \ldots, [a/d_{n-1}]=[(a+qp)/d_{n-1}]-[q]p/d_{n-1}$ is stored in a register of the processing circuitry and the secure computation is used in machine learning or data mining.

7. A secure computation method, wherein [μ] is a secret share value of μ, a is a real number, $m_0$ and $m_1$ are multipliers of real numbers, and c is a value of 0 or 1 indicating a condition, the secure computation method, performed by processing circuitry, comprising:

obtaining $[m_0a]$ and $[m_1a]$ through secure computation using a secret share value [a] and the multipliers $m_0$ and $m_1$; and obtaining and outputting a secret share value $[c?m_0a:m_1a]$ of mea through secure computation using secret share values [c], $[m_0a]$, and $[m_1a]$, wherein the secret share value $[c?m_0a:m_1a]$ is stored in a register of the processing circuitry and the secure computation is used in machine learning or data mining.

8. A non-transitory computer-readable recording medium storing a program for causing a computer to perform the method of claim 6.

9. A non-transitory computer-readable recording medium storing a program for causing a computer to perform the method of claim 7.

10. A secure computation method, wherein [μ] is a secret share value of μ, a is a real number, n is an integer equal to or greater than 2, d0, ..., dn−1 are divisors of real numbers, p is a modulus of a positive integer, and q is a quotient of a positive integer, the secure computation method, performed by processing circuitry, comprising:

obtaining a secret share value [q] of a quotient q of a/p through secure computation using a secret share value [a] and a modulus p; and obtaining and outputting a secure computation value f([a], [q], dθ) of a value obtained by operations including right-shifting and division by a public value dθ for θ=0, ..., n−1 through secure computation using the secret share value [a], the secret share value [q], the divisors d0, ..., dn−1, and the modulus p, wherein the secure computation value f([a], [q], dθ) is stored in a register of the processing circuitry and the secure computation is used in machine learning or data mining.

11. A non-transitory computer-readable recording medium storing a program for causing a computer to perform the method of claim 10.

* * * * *